UNITED STATES PATENT OFFICE.

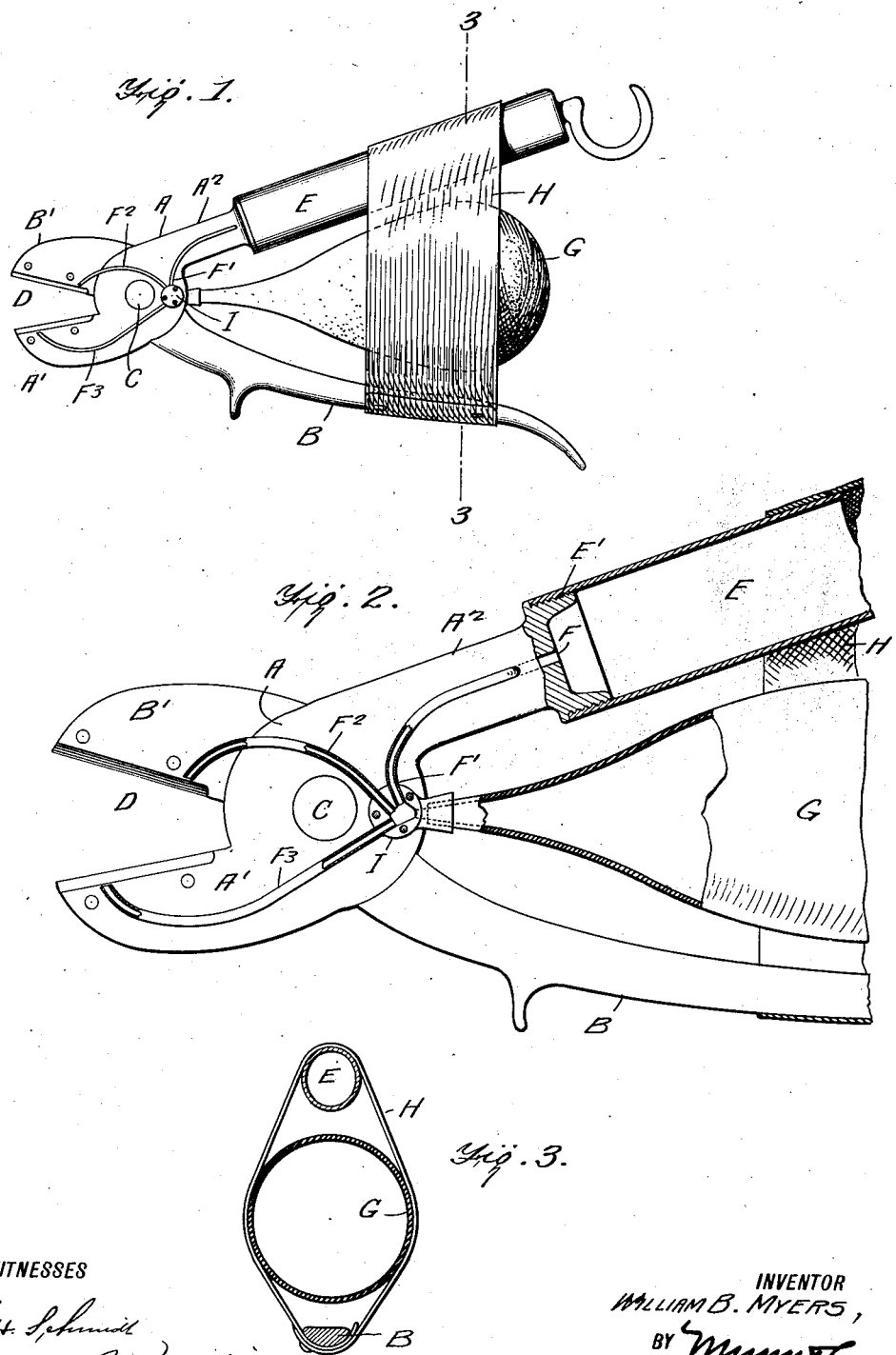

WILLIAM B. MYERS, OF ROCKLEDGE, FLORIDA.

CLIPPING-TOOL.

1,056,046.

Specification of Letters Patent.  Patented Mar. 18, 1913.

Application filed November 1, 1911. Serial No. 657,925.

*To all whom it may concern:*

Be it known that I, WILLIAM B. MYERS, a citizen of the United States, and a resident of Rockledge, in the county of Brevard and State of Florida, have invented certain new and useful Improvements in Clipping-Tools, of which the following is a specification.

This invention is an improvement in clipping tools such as orange clippers, pruning shears, lopping shears and the like and the invention has for an object to provide for disinfecting the wound or cut made by the clipper and the invention consists in certain novel constructions and combinations of parts as will be hereinafter described and claimed.

In the drawing Figure 1 is a side view of a pair of clippers embodying my invention. Fig. 2 is a side elevation thereof, partly in section showing the channels for the disinfecting liquid and spray. Fig. 3 is a cross section on about line 3—3 of Fig. 1 showing the strap fastening in its relation to the rubber bulb and the other parts of the clippers.

By my invention I seek to provide in connection with the clippers, means carried thereby to spray over the newly cut surface at each cutting operation, a quantity of disinfecting liquid which latter may be of any suitable composition adapted for the purpose and intended to destroy any germs or fungus elements and thus prevent any diseases entering the tree or plant through the exposed cut surface.

In the construction shown, the clippers have the members A and B which in general respects, may be of ordinary construction, are pivoted together at C and are formed to cut at D near the base of the jaws A' and B' of their respective members. One of the members has an integral handle as shown and the other has its handle made in sections $A^2$ and E, the latter being of brass or other suitable material, forming a reservoir which is screwed at E' on the end of the section $A^2$ of the member A. This member A is provided with a channel F communicating at one end with the reservoir or container E and extending at its other end to a point where it communicates at F' with the discharge of the atomizer G which is shown as a rubber bulb carried by the member A and braced or fastened in position by a strap H. This bulb lies between the handles of the clippers, thus operating as a spring to open the said handles after a cutting operation and it may be connected at its discharge end in any suitable manner with the member A. This member A is also provided with passages $F^2$ and $F^3$ extending from the discharge of the air bulb G, so that the disinfecting liquid will be sprayed at the cutting point D of the two sections so that in operation as the cutting is effected the wound formed in the plant or tree will be sprayed with a disinfecting liquid. While the rubber bulb may be preferred in some instances, it is manifest any other suitable form of air pump might be utilized to secure some of the desired results without departing from the broad principles of my invention. The passages F', $F^2$ and $F^3$ are shown as tubes seated in grooves or channels in the face of the member A, the tube $F^2$ extending at its end beyond the member A. A small union I secured by screws or otherwise to the section A receives the adjacent ends of the tubes or pipes F', $F^2$ and $F^3$.

The construction shown is especially designed for use in clipping oranges and the disinfecting liquid being held in the container or reservoir will be drawn through the passages by the action of the air pump situated between and operated by the closing of the handles to throw a spray over the newly cut surface of the twig at each cutting operation, the spraying operation being automatic and the container being designed to hold enough liquid to last for several hours.

It is recognized by those in a position to know, that fungus diseases are transmitted by cutting implements and the improved device herein presented will effectually and automatically prevent contagion in such manner.

I claim:

1. A clipping tool having a pair of members pivoted together and having said members provided in their faces adjacent to their cutting ends with grooves or channels and with tubes seated therein, a container provided with a discharge tube, a union carried by one of the members and with which union the tubes of the container and said members communicate, and an air discharge device also communicating with the said union, whereby to secure a spraying of the contents of the container through the tubes seated in the grooves of the members, substantially as set forth.

2. A clipping tool comprising two members fitted together, a union carried by one of said members, discharge tubes leading from said union to a point adjacent to the cutting edges of the clipper, a container communicating with said union, and an air discharge device communicating with said union, substantially as set forth.

WILLIAM B. MYERS.

Witnesses:
L. S. ANDREWS,
R. N. ANDREWS.